(12) United States Patent
Asada et al.

(10) Patent No.: US 6,526,960 B2
(45) Date of Patent: Mar. 4, 2003

(54) WIRE-SAW AND METHOD FOR MANUFACTURING THE SAME

(75) Inventors: Toshihiko Asada, Chofu (JP); Tadao Ishikawa, Mobara (JP)

(73) Assignee: Asaoka Co., Ltd., Tokyo (JP)

( * ) Notice: Subject to any disclaimer, the term of this patent is extended or adjusted under 35 U.S.C. 154(b) by 0 days.

(21) Appl. No.: 09/782,705

(22) Filed: Feb. 13, 2001

(65) Prior Publication Data

US 2001/0035173 A1 Nov. 1, 2001

(30) Foreign Application Priority Data

Feb. 16, 2000 (JP) ........................................ 2000-079070

(51) Int. Cl.$^7$ ................................................. B28D 1/08
(52) U.S. Cl. ............................. 125/21; 125/22; 125/18
(58) Field of Search ........................... 125/16.01, 16.02, 125/18, 21, 22; 83/651.1

(56) References Cited

U.S. PATENT DOCUMENTS

| | | | | |
|---|---|---|---|---|
| 2,633,681 A | * | 7/1953 | Sam .............................. | 51/204 |
| 4,674,474 A | * | 6/1987 | Baril ............................ | 125/21 |
| 4,907,564 A | * | 3/1990 | Sowa et al. .................... | 125/21 |
| 5,377,659 A | * | 1/1995 | Tank et al. .................... | 125/21 |
| 6,257,223 B1 | * | 7/2001 | Ghio ............................ | 125/12 |

* cited by examiner

*Primary Examiner*—George Nguyen
*Assistant Examiner*—Dung Van Nguyen
(74) *Attorney, Agent, or Firm*—Pitney, Hardin, Kipp & Szuch LLP

(57) ABSTRACT

A wire-saw constituted by a rope-like core wire and a cylindrical coil-like saw-wire body wounded around the core wire, and a large number of abrasive grains firmly fixed to the saw-wire body by metal. Problems of conventional wire-saws, such as unstable working performance, a short tool life, low safety and low reliability, and so on, are solved.

3 Claims, 2 Drawing Sheets

WIRE-SAW AND METHOD FOR MANUFACTURING THE SAME

BACKGROUND OF THE INVENTION

1. Field of the Invention

The present invention relates to a rope-like wire-saw having a large number of abrasive grains firmly fixed to the outer circumferential surface thereof by metal, and further relates to a method for manufacturing such a wire-saw.

2. Description of the Related Arts

As a conventional wire-saw, there is widely known a impregnated metal-bonded wire-saw in which abrasive grains and metal powder are mixed and molded, then the molded mixture is burned together with beads to produce beads having an abrasive layer portion, and the beads are fixed to a metal wire rope. Such a wire-saw is used for cutting a stone or a concrete structure. (For example, see JP-B-49-2231, and JP-B-51-38473)

There is also widely known a wire-saw in which abrasive grains are brought into direct contact with beads, without using any metal bonding, to fix the abrasive grains to the beads by precipitating nickel or the like in gaps among the abrasive grains by electroplating, chemical plating, or the like, and the beads are fixed to a wire.

In a conventional metal-bonded grinding tool, a cutting edge is exposed by self-dressing caused by chips of a subject to be cut. Therefore, the cutting performance varies conspicuously in accordance with the choice of a bonding composition. In addition, the amount and shape of such chips vary in accordance with machining conditions. Therefore, the cutting performance varies also in accordance with the matching (compatibility) between the bonding composition and the subject to be cut.

In addition, the bonding composition is worn to expose abrasive grains. However, because there is no chemical linkage between the bonding composition and the abrasive grains, the abrasive grains easily fall away from the bonding composition. Therefore, the rate with which the abrasive grains can be engaged in cutting in the whole of the tool is so low as to cause unstable cutting and reduction in the life of the tool.

Further, as shown in FIG. 1, in a conventional impregnated metal-bonded wire-saw 1, abrasive layer beads 6 are fixed to a core wire 3 at a predetermined interval by caulking, and further fixed by a covering material 8 of plastic, rubber, or the like. Accordingly, flexibility or stress dispersion performance essential for the wire is blocked.

SUMMARY OF THE INVENTION

It is therefore an object of the present invention to solve fundamentally the foregoing problems.

It is another object of the present invention to provide a wire-saw which does not depend on self-dressing caused by a subject to be cut; in which the cutting performance is immutable in safety and for a long time; and which is long in life and excellent in cutting performance; and to provide a method for manufacturing such a wire-saw.

The wire-saw according to the present invention comprises: a saw-wire body rolled up like a cylindrical coil; a large number of abrasive grains firmly fixed to an outer surface of the cylindrical coil of the saw-wire body by metal; and a rope-like core wire fixedly inserted into an inner space of the cylindrical coil of the saw-wire body over a whole length of said cylindrical coil.

Further, the method for manufacturing a wire-saw, according to the present invention, comprises the steps of: kneading additive materials with powder containing copper alloy or the like as a main component to thereby form a mixture; continuously disposing the mixture on an outer surface of a saw-wire body rolled up like a cylindrical coil; coating a surface of the continuously disposed mixture with an active metal brazing material; scattering and disposing a large number of abrasive grains on the brazing material; heating the saw-wire body as a whole to a temperature to melt the alloy component partially or wholly in a vacuum or reducing or neutral atmosphere so that the abrasive grains are fixed firmly to positions where the abrasive grains are disposed respectively by the metal component; and fixedly inserting a rope-like core wire into an inner space of the cylindrical coil of the saw-wire body over a whole length of said cylindrical coil.

In the wire-saw according to the present invention, the core wire is composed of a steel wire in the same manner as that in a wire rope of a conventional wire-saw.

On the other hand, the abrasive grains may be selected from a group composed of diamond, cubic boron nitride, silicon carbide, and cemented carbide.

In addition, the coil-like saw-wire body may be fixed to the core wire by the friction generated by elastic deformation of the coil-like saw-wire body. Further, at least the surface of the core wire may be covered by rubber, plastic or the like, in order to prevent the core wire from corrosion.

Further, it is extremely preferable that opposite end portions of the core wire forming the wire-saw are connected with each other endlessly through a wire connection sleeve having an outer circumferential surface to which a large number of abrasive grains are firmly fixed. Thus, the cutting performance of the wire-saw can be enhanced.

With such a configuration, a continuous cutting edge having the abrasive grains on the saw-wire body in the wire-saw can be formed according to the present invention. In addition, the saw-wire body is rolled like a cylindrical coil. Accordingly, the sharpness and life of the cutting edge can be controlled by changing the pitch of the coil to adjust the average distance among the abrasive grains. Further, the saw-wire body is made of steel similarly to the core wire, and has a continuous coil-like shape so that the cutting edge of the abrasive grains is always in contact with the subject to be cut. Accordingly, vibrations apt to be generated by intermittent cutting can be reduced. Further, as a feature of the coil-like shape, the spiral angle can be always kept with respect to the cutting direction. Accordingly, self rotation is caused on the whole of the wire-saw in the work time. Thus, one-sided abrasion of the wire can be prevented, extremely advantageously on the elongation of the life of the tools.

In addition, the coil-like saw-wire body gives tension and flexibility to the core wire and makes it possible to cut a small-curvature portion of a subject to be cut by the saw-wire body while suitable stress dispersion can be provided against the tension produced by driving the wire-saw.

DETAILED DESCRIPTION OF THE PREFERRED EMBODIMENTS

An embodiment of the present invention will be described below with reference to the drawings.

Figure 1:
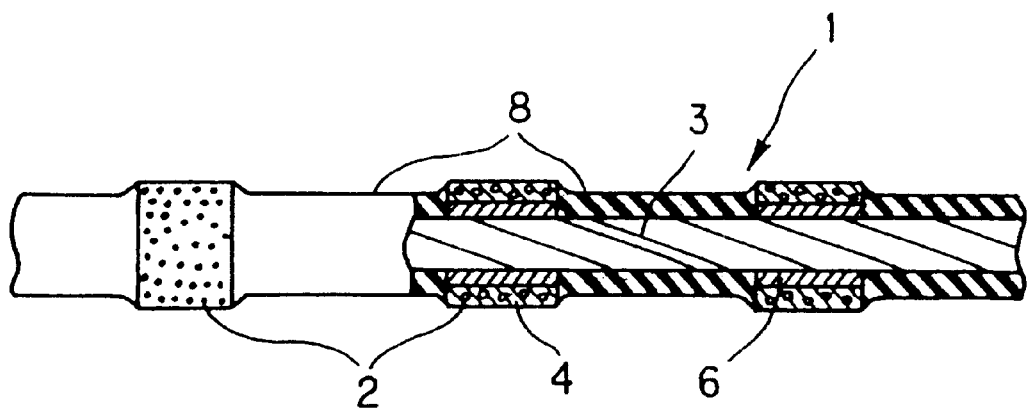
FIG. 1 is a partially longitudinally sectional front view of a conventional impregnated metal-bonded wire-saw.

FIG. 1 is a partially longitudinally sectional front view of a conventional impregnated metal-bonded wire-saw 1. In this wire-saw 1, diamond abrasive grains 2 are disposed on beads 6 through metal-bonding layers 4, and the beads 6 are fixed to a core wire 3 of the wire-saw 1 at intervals in the longitudinal direction of the core wire 3.

Figure 2:
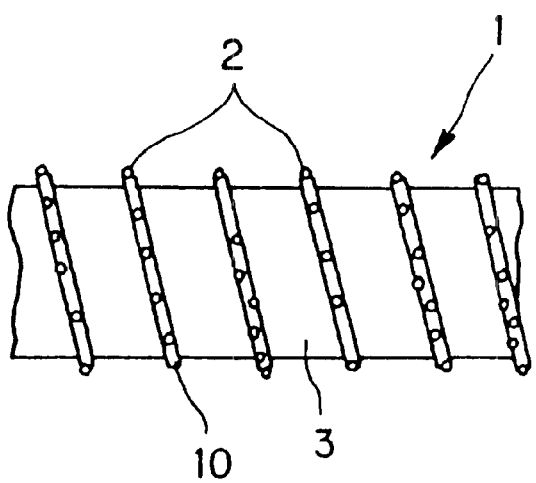
FIG. 2 is a front view showing a part of a wire-saw according to the present invention.

FIG. 2 is a front view showing a part of one embodiment of a wire-saw 1 according to the present invention. For example, this wire-saw 1 is manufactured as follows. Additive materials such as paraffin, polyethylene glycol, etc. are kneaded with powder comprising copper alloy (containing Sn by 20 wt %) as a main component to thereby form a mixture. The mixture is molded like a ribbon, for example, and continuously disposed on the outer surface of a coil-like saw-wire body 10. An active metal brazing material such as a titanium-containing brazing material is applied to the surface of the mixture, and abrasive grains 2 are scattered and disposed on the brazing material. Then, these materials as a whole are heated up to a temperature to melt the alloy component partially or wholly, for example, to 850° C. for about 10 minutes in a vacuum atmosphere of $10^{-3}$ Pa or lower, or in a reducing or neutral atmosphere. Thus, the abrasive grains 2 are firmly fixed onto the coil-like saw-wire body 10 by the metal component by means of the brazing material.

A rope-like core wire 3 is inserted into the inner space of the coil-like saw-wire body 10, in which a large number of abrasive grains 2 are firmly fixed to the outer surface thereof, over the whole length of said coil-like saw-wire body. The core wire 3 is fixed to the saw-wire body per se by the elastic deformation of the saw-wire body, or the like. Thus, the wire-saw 1 is completed.

Figure 3:
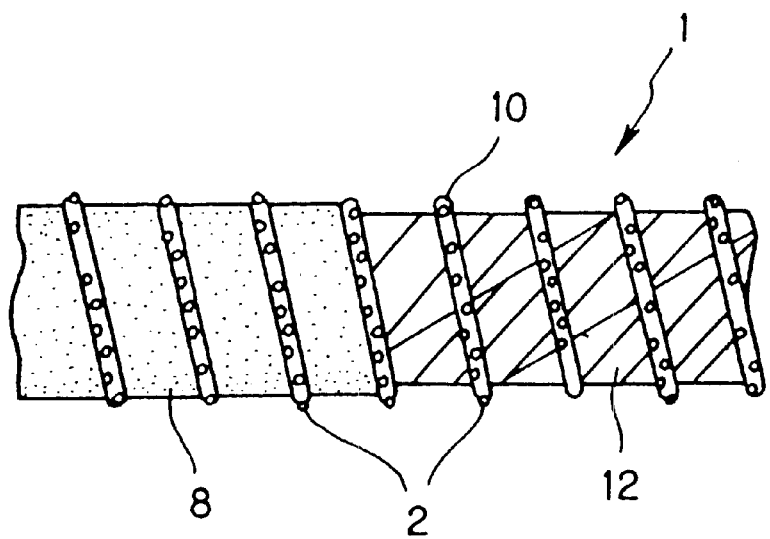
FIG. 3 is an explanatory view showing an embodiment of the present invention in which a stranded core wire is covered by a covering material which is partially peeled off for explanation.

Further, the whole of the wire-saw 1, or the outer circumference of the core wire 3 may be covered by a covering material 8 of rubber or plastic so that the surface of the core wire 3 is shielded. For example, as shown in FIG. 3, a wire-saw 1 having a stranded core wire 12 illustrated in the right half of the drawing is covered by the covering material 8 of black rubber, or the like, illustrated in the left half of the drawing. In this case, if the whole of the wire-saw 1 is first covered by the covering material 8, the cutting edge of the abrasive grains breaks the covering material in response to the use of the wire-saw, and then, the covering material on the saw-wire body is peeled off so that the wire-saw 1 can be brought into the covered state illustrated in the left half of the drawing.

In addition, since zinc or tin component is disposed on the saw-wire body, the adhesion between the rubber and the saw-wire body is high enough to obtain higher bonding strength than the strength of the rubber itself.

The grain size of the abrasive grains 2 is preferably in a range of from 20 to 80 U.S. meshes, but it may be set to be in a range of from 80 to 400 U.S. meshes in accordance with circumstances.

The copper alloy may be a combination of a bronze alloy containing Sn in a range of from 10 to 33 wt %, a brass alloy containing Zn in a range of from 5 to 20 wt %, an aluminum alloy containing Al in a range of from 1 to 13 wt %, etc. The copper alloy of copper, tin and aluminum which is not reactive to carbon and which has a large solid solubility limit of active metal are preferable. As the active metal brazing material, a titanium-containing active metal brazing material is preferably used, and the thickness of the brazing material is set to be 10 to 60% of the abrasive grain size. The brazing material is prepared so that the ratio of the active metal brazing material to the copper alloy is in a range of from 7 to 20 wt %. It is appropriate that the projecting quantity of the abrasive grains is in a range of from 30 to 70% of the abrasive grain size in the state where the abrasive grains are wet with the brazing material.

Figure 4:
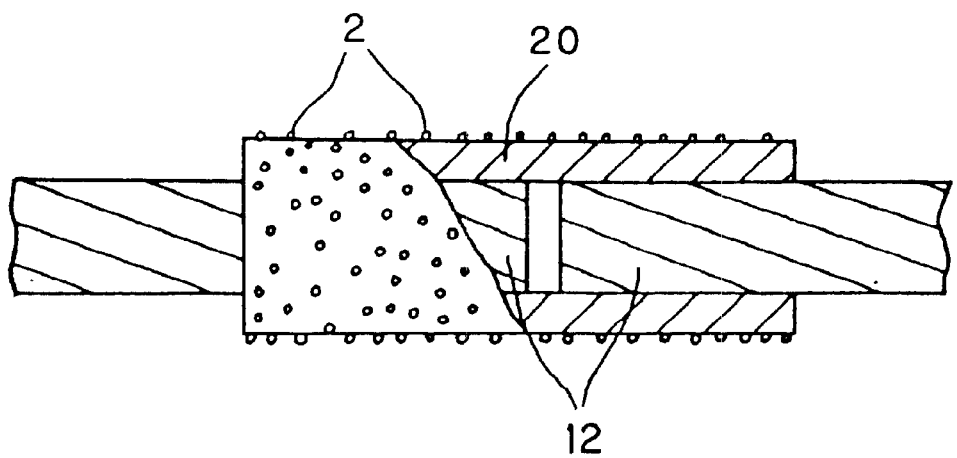
FIG. 4 is an explanatory view showing an embodiment of a connection portion of the wire-saw according to the present invention.

One embodiment of the method for connecting the opposite end portions of the wire-saw 1 according to the present invention with each other to make an endless wire-saw will be described with reference to FIG. 4.

First, a wire connection sleeve 20 which is made of steel and in which a large number of abrasive grains 2 are firmly fixed to the outer circumferential surface in the same manner as abrasive grains are firmly fixed to the coil-like saw-wire body 10 is prepared. The sleeve 20 is designed so that the inner diameter of the sleeve 20 is substantially equal to the outer diameter of the core wire, that is, the outer diameter of the stranded core wire 12. On the other hand, the outer diameter of the sleeve 20 is substantially equal to the outer diameter of the coil-like saw-wire body 10 after completion of the connection process. Then, respective end portions of the stranded core wire 12 are inserted into the inner space portion of the sleeve 20 from the opposite ends of the sleeve 20 thereby the stranded core wire 12 being brought into the state shown in FIG. 4. After then, strong caulking is applied from the outer circumference of the sleeve 20 to thereby deform the sleeve 20 so that the outer diameter of the sleeve 20 becomes substantially equal to the outer diameter of the coil-like saw-wire body 10 and the connection is completed. Incidentally, though not shown in the drawing, after the working of the connection, a slight gap is left between the opposite end portions of the sleeve 20 and the respective end portions of the coil-like saw-wire body 10 located on the opposite sides of the sleeve 20.

Example

A wire-saw having a diameter of 8 mm and a length of about 25 m was manufactured according to the present invention. A fiber-reinforced plastic (FRP) material was cut off by use of a movable wire-saw machine equipped with wire-saws described below, and the cutting speed was measured. Thus, the working performance was compared with those in a conventional impregnated metal-bonded wire-saw and a conventional electro-deposition wire-saw. In each wire-saw, abrasive grains were of diamond, and the diameter of the abrasive grains was 40/50 meshes.

As a result, the cutting speed in the wire-saw according to the present invention was 10% to 30% higher than those in the conventional wire-saws. Thus, the high cutting performance of the wire-saw according to the present invention was confirmed.

As for the durability, extremely abnormally one-sided abrasion occurred in the impregnated wire-saw, and it was observed that such abrasion reached the beads partially. In addition, in the electro-deposition wire-saw and a connection tool therefor, FRP was partially burned and welded like nodes. It was considered that such nodes were the cause of lowering the cutting performance. The abrasive grains hardly fell away in the wire-saw according to the present invention. Thus, it was proved that the wire-saw according to the present invention was excellent also in durability. In addition, burning was not observed at all.

The wire-saw manufactured by the method according to the present invention can ensure a very large projecting amount of abrasive grains. Accordingly, chips of a subject to be cut are removed well and cutting resistance is prevented from increasing because the contact between the bonding portion and the subject to be cut is little. As a result, the wire-saw exhibits high working performance and also excellent dissipation of cutting heat.

In addition, since the abrasive grains are scattered, the intervals among abrasive grains can be adjusted desirably, for example, they may be increased. Further, since the abrasive grains are firmly fixed by metal, the stable cutting performance can be maintained for a long time and the abrasive grains can be utilized effectively. The strength of the core wire can be enhanced by suitably selecting the material. Accordingly, a thin wire-saw can be manufactured so that the working efficiency is improved. Therefore, the wire-saw according to the present invention is effective particularly in cutting FRP or the like which is easy to clog the wire-saw or apt to be burned.

In addition, the wire-saw according to the present invention can be adapted for wide applications, such as cutting of hard stones, concrete structures, artificial marbles, ceramics, composite materials of the above materials, or the like. According to the present invention, it is possible to provide a wire-saw light in weight and easy to handle and as a result, low in cost, high in safety and high in added value as a whole.

What is claimed is:

1. A wire-saw comprising:

a saw-wire body rolled up like a cylindrical coil and continuously disposing on an outer surface a mixture which is formed by kneading additive materials with powder containing a copper alloy as a main component and of which the surface is coated with an active metal brazing material;

a large number of abrasive grains firmly fixed to an outer surface of said cylindrical coil where said abrasive grains are disposed respectively by metal component while heating said saw-wire body on a whole to a temperature to melt said alloy component or wholly in a vacuum or reducing or neutral atmosphere; and rope-like core wire fixedly inserted into an inner space of the cylindrical coil of the saw-wire body over a whole length of said cylindrical coil.

2. The wire-saw according to claim 1 wherein opposite end portions of said core are connected with each other to make an endless wire-saw through a wire connection sleeve having an outer circumferential surface to which a large number of abrasive grains are firmly fixed.

3. A method for manufacturing a wire-saw, comprising the steps of:

kneading additive materials with powder containing copper alloy as a main component to thereby form a mixture;

continuously disposing said mixture on an outer surface of a saw-wire body rolled up like a cylindrical coil;

coating a surface of said continuously disposed mixture with an active metal brazing material;

scattering and disposing a large number of abrasive grains on said brazing material;

heating said saw-wire body as a whole to a temperature to melt said alloy component partially or wholly in a vacuum or reducing or neutral atmosphere so that said abrasive grains are fixed firmly to positions where said abrasive grains are disposed respectively by the metal component; and fixedly inserting a rope-like core wire into an inner space of the cylindrical coil of the saw-wire body over a whole length of said cylindrical coil.

* * * * *